Oct. 18, 1949.   J. F. DREYER   2,484,818
LIGHT POLARIZING MIRROR
Filed Dec. 9, 1944
Fig. 1.
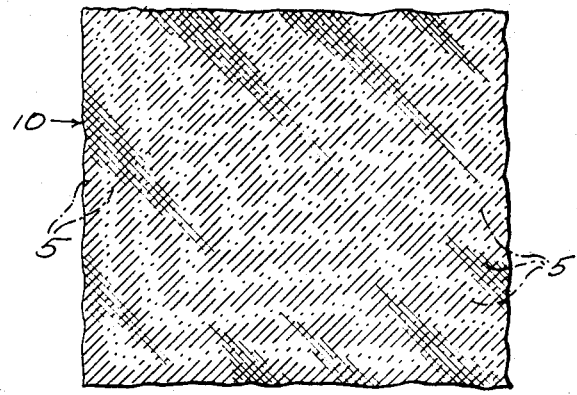
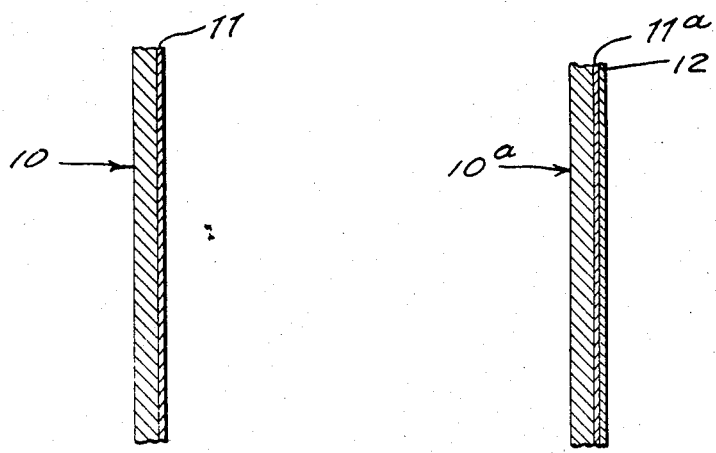
Fig. 2.    Fig. 3.
INVENTOR
JOHN F. DREYER.
By Blair, Curtis & Hayward
ATTORNEYS Patented Oct. 18, 1949

2,484,818

UNITED STATES PATENT OFFICE 2,484,818

LIGHT POLARIZING MIRROR

John F. Dreyer, Cincinnati, Ohio, assignor to The General Polarizing Company, Cincinnati, Ohio, a corporation of Ohio Application December 9, 1944, Serial No. 567,350

3 Claims. (Cl. 88—65)

This invention relates to light reflecting means having the power to polarize light as it is reflected therefrom; and is particularly concerned with mirrors and the like which are themselves selectively reflecting with respect to the electrical vector of light reflected therefrom or which are associated with means for polarizing the reflected light.

Prior to my invention many means have been known for polarizing light and particular notice may be taken of reflection polarization wherein a transparent substance is adjusted at such angle to incident light that plane polarized light is reflected from the surface thereof while light other than that so polarized is largely passed through the substance to be absorbed by a suitable light absorbing material. Although my present invention contemplates selective reflection to obtain plane polarized light, it is of a different nature than the practice of the prior art noted above in that the angle of the incident light with the reflecting surface is immaterial to polarization. According to my invention there is provided a reflecting surface and in combination therewith a substance capable of polarizing the reflected light.

A highly advantageous embodiment of my invention uses polarizing films of the unusual character described in my earlier applications Serial Nos. 217,249, 263,779, now abandoned, and my Patent No. 2,400,877 of which this application is a continuation-in-part. Briefly, these films are molecularly oriented dichroic materials in amorphous (i. e. non-crystalline) state. The method of their formation is simple although care in preparation is essential to full development of their polarizing character. An anisotropic underlying surface is prepared, e. g., by brushing or rubbing in one direction to provide an orienting field and a clean surface of a desired geometric form. A polar material in a fluid state is then applied thereto as a solution or a fused mass, whereupon the polar material is brought into the nematic state. In such nematic state the molecules orient themselves with respect to the anisotropy of the supporting surface. This nematic state is a physical state of matter which borders on the crystalline state, but unlike the crystalline state allows the molecules freedom to move in any direction without rotation. Unlike the liquid state, the nematic state does not allow random motion of molecules but requires them to maintain a definite orientation to a given axis so that each molecule can rotate only about an axis parallel to the axis of said orientation. Unless precautions set out in my said prior applications and repeated hereinafter are observed, crystallization will occur, and since the phenomenon of crystallization involves rearrangement of molecules under molecular forces much stronger than the field effects which I use for orientation, the orientation essential to my polarizing films is therefore destroyed when crystallization occurs. It is necessary that solidification shall occur in such manner that the orientation is retained and crystal formation substantially avoided, thus giving an oriented amorphous or resinoid film.

These films, as contrasted with previously known polarizing "films" are continuous homogeneous, non-crystalline solid films of dichroic substance. In this they differ essentially from materials (such as "Polaroid") having a large number of oriented crystals embedded in a transparent film. The preferred dichroic films are therefore polarizing throughout their whole extent with no spaces through which light can pass unaffected, and are polarizing at the surface, reflecting light polarized on one axis while passing light polarized on the perpendicular axis. They are, moreover, capable of application to or formation on curved surfaces of all varieties. When applied as mirrors according to this invention, they are not restricted in effectiveness for selective reflection to incident light falling thereon at or near the critical angle.

Accordingly it is an object of this invention to provide mirrors and other light reflecting structures by combination of a reflecting surface with a molecularly oriented non-crystalline dichroic substance.

It is a further important object to provide polarizing reflectors having simple or compound curved surfaces.

Another object of the invention is to provide rearview mirrors for automobiles, marine craft, etc., as well as mirrors for machinery of various kinds for better observation of work or moving parts and which will eliminate glare and other polarized component of light.

Additional objects of the invention include the provision of novel and useful optional instruments and signalling devices embodying the novel polarizing reflectors.

Other objects and advantages of my invention will appear from the following description and the accompanying drawings.

Although in these drawings and in the following specification I have shown a preferred embodiment of my invention and various alternatives and modifications thereof, it is understood that these are not intended to be exhaustive nor limiting of the invention, but, on the contrary, are given with a view to illustrating and explaining the principles of the invention and their embodiment for practical use, in order that others skilled in the art may be enabled to adapt and modify them in numerous embodiments and modifications, each as may be best adapted to the conditions of any particular use.

In the drawings accompanying this specification,

Figure 1 is an elevation of a mirror adapted for use as an automobile rear view mirror in connection with an anti-glare lighting system heretofore proposed;

Figure 2 is a vertical section through a mirror according to my invention; and

Figure 3 is a similar section through a mirror according to an embodiment of the invention different from that of Figure 2.

It has been proposed that automobiles be equipped with polarizing headlights and windshields adapted to polarize light in parallel planes at an angle of 45° to the horizontal. If this practice were standard, the headlights of each car would furnish ample illumination of the road; while no driver would be temporarily blinded by the glare of the headlights of a car approaching from the opposite direction, since his windshield would not admit light direct from the headlights of the other car.

The mirror of Figure 1 is adapted for use in such a system to permit full use of a rear view mirror without blinding glare from the headlights of a following car; and, in Figure 1, I have indicated by broken lines 5 the direction of the electrical vector of light after reflection from the polarizing material. In such case, the plane of polarization of the rear view mirror is at right angles to that of the headlights and windshield, wherefore it reflects a rear view without reflecting the strong light from the headlights of a following car. Since the proposed system described above would permit and probably require headlights of considerably greater candlepower than are now in use, the desirability of such a rear view mirror is readily apparent. Because polarization of the reflected component is perpendicular to that of the transmitted component, it is also possible to use the same screen to serve as analyzer for approaching and following headlights. A phantom reflection in the screen will be visible without glare.

This one use is illustrative of the advantages to be obtained by the use of my present invention, but many other uses will be at once apparent. For example, reflecting optical systems, such as periscopes, may be constructed using such mirrors to eliminate sky glare or glare due to spectral reflection of sunlight.

As a further valuable use, polarizing mirrors may be used to impose a strong beam of polarized light in the path of a signal beam to obliterate the signal from ordinary observation. Reception of the signal beam would then be dependent on the use of a properly oriented analyzer to eliminate the strong masking polarized beam for interpretation of the signal beam which may be of ordinary light or polarized in a plane different from that of the masking beam. Thus a strong light may be continuously reflected from the face of a plate or lens coated according to my invention and a weaker beam of light then passes through from the opposite side. The transmitted beam will be polarized perpendicularly to the reflected beam so that an analyzer can separate the two and make the signal beam apparent.

The section of Figure 2 illustrates the structure of a preferred type of mirror in which a polarizing material is disposed over a base 10 which establishes a reflecting surface. The reflecting surface may actually consist of a continuous film of amorphous dichroic material 11.

The dichroic film 11 is of a type to reflect selectively light plane polarized in one direction. The preparation of such dichroic films is described below.

In the preferred embodiments of my invention, the polarizing films 11 and 11a are plane polarizers and may be dyes or other materials which are in themselves capable of polarizing light.

Such materials, in the preferred embodiments of my invention, may be applied and oriented in accordance with my invention described and claimed in my Patent No. 2,400,877, which method may be described generally as consisting of rubbing the surface which is to become the polarizing surface uniformly in one direction along the line or lines on which the polarizing material is to be oriented and subsequently applying the polarizing or polarizable material in a film, preferably fused or dissolved, and bringing it into the nematic state wherein it orients itself uniformly along the lines of rubbing. It is then quickly and uniformly solidified from the nematic state so as to set the orientation before any reorientation or other disturbance, e. g., due to crystallization, can occur. I use the term "polarizable" herein to include both materials which, when properly oriented, are inherently capable of polarizing light passed therethrough and materials which may be made capable of polarizing light by a subsequent treatment which does not disturb their orientation.

As one example, I may coat a piece of glass intended as a base 10 as follows: The surface of the glass first is cleaned, for example, by dipping it in a concentrated solution of 100 parts by weight of potassium bichromate and 70 parts concentrated sulfuric acid (66° Bé.). After ten minutes the glass is removed from the solution and adhering chemical is washed off. The surface is then wiped dry with clean absorbent paper or a cloth, rubbing along the lines of the desired orientation, e. g., as indicated by the broken lines in Figure 1, or the surface may be dried by evaporation if subsequent rubbing treatment is carried out for orientation; for example, by a buffing wheel, which may advantageously be formed of cotton or wool cloth, felt, or paper. The direction of rubbing, or in the case of the buffing wheel, the plane of the wheel, in this treatment will always be kept parallel to the lines of orientation desired in the finished mirror. It is this rubbing in the present example which produces the desired orientation and controls the plane of polarization of the resulting polarizing surface.

To the rubbed surface, I now apply a film of the polarizable material which may be, for example, a solution consisting of twenty parts by weight of methylene blue (zinc free) dye in one hundred parts of methyl alcohol. The film of the dye solution may be applied by dipping the glass into the solution and removing it, preferably at a uniform speed of two inches per minute into an atmosphere saturated with methyl alcohol. When the glass is completely removed, it is shifted quickly into a gentle current of dry air of relative humidity below 30%, which flows uniformly across its surface. The air temperature may be, for example, between 50° F. and 80° F., and the air speed is preferably regulated so that each point on the film dries in about three seconds after it comes into the dry air stream.

When the coating has dried the glass is dipped into a solution containing 2% sulfuric acid and saturated with potassium dichromate. The coating 11 is then washed gently with water and dried in air.

As an example of a fused coating, a sheet of glass prepared as in the preceding example may, instead of being treated with the methylene blue solution as described above, be dipped into a fused bath of azoxyphenetol, maintained at a temperature of about 134 to 170° C. In this case, instead of an atmosphere saturated with solvent, I use an atmosphere above the bath kept at a temperature above the upper melting point of the azoxyphenetol. The glass is withdrawn into this atmosphere as it was withdrawn from the methanol solution in the preceding example. When the coating is complete, the glass temperature is reduced so that the cooling of the film progresses from the inside out, but in any case sufficiently fast so that crystallization does not occur.

The base 10 is advantageously of black glass or other light absorbing material so that reflection occurs chiefly at the surface of the polarizing material and polarization is an incident of reflection.

A protective transparent cover film may be used in any case. This is illustrated, for example, in Fig. 3 wherein the film 12 may be formed by applying a lacquer solution, e. g., by dipping in or spraying on a 5% solution of methyl methacrylate resin (Lucite) in toluol; or the protective film may be pre-formed and the dichroic amorphous film applied thereon. In this latter case the protective material may be glass or other transparent sheet material or film. In such case, the dichroic amorphous film may be formed on the protective element 12 and the latter is then affixed to a reflecting and/or supporting surface in any suitable manner, as by means of a transparent adhesive. It will be understood that the amorphous dichroic film need not be adjacent a reflecting surface.

Where a transparent polarizing film is desired at a mirror surface to polarize by transmission without a complementary reflected component, materials may be selected which do not exhibit the metallic reflection characteristic of many dye films. A good example of such dye is that known as Brilliant Yellow, color index No. 364, a phenol derivative of stilbene manufactured commercially by E. I. du Pont de Nemours & Company, and probably having the formula:

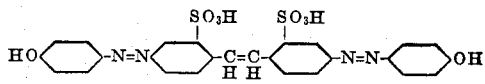

As one example of my present invention, a glass surface, treated with a thin film of methyl cellulose solution and dried and then rubbed along parallel lines to develop an orienting anisotropic surface, e. g., in accordance with my companion application Serial No. 384,550, may be coated, e. g., by dipping, spraying or flowing, with a film of liquid consisting of a concentrated solution (i. e., molecular dispersion) of said Brilliant Yellow in a suitable solvent, for example, methanol. A thin uniform continuous film of this solution is thus applied to the prepared surface and is thereafter dried by exposure to a gentle flow of air at approximately 70° F. The film upon drying will be a dichroic film, uniformly oriented in accordance with the lines of rubbing. In ordinary light the film will be transparent and tinted yellow, but in plane polarized light the transmission is cut down to a fraction of that in ordinary light and the yellow becomes very much deepened to an intense golden color.

If this resulting film is dipped in, or otherwise treated with, an acid solution, e. g., a stannous chloride solution of about 2.0 pH, the yellow coloration changes to a black which in ordinary light is transparent, cutting down the intensity of incident light to some extent but without substantial change in coloration, whereas, with plane polarized light and crossed with respect to the electrical vector of the polarized light, the film appears black and allows only a small fraction of the light to pass therethrough. The molecular change produced by the acid treatment is believed to result in a compound having the formula:

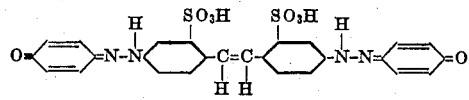

The development of the chromophoric quinoid groups is apparently responsible for the improvement in the polarizing efficiency. Although this effect on the dye is produced by acids generally and is apparently analogous to the well-known effect of change of pH on indicator materials, which is used in chemistry for pH determination and control, it is important for my purposes to use a material which forms a stable compound. Thus, for example, with a volatile acid such as hydrochloric, the reaction is reversible with gradual loss of the acid and a gradual reconversion of the film to the yellow form. I prefer for this purpose to use an acidic salt such as stannous chloride, zinc chloride, cuprous chloride or aluminum chloride. Other acidic materials which do not suffer loss of the acid ion may be used in a similar manner, e. g., phenol sulfuric acid.

Instead of the dye mentioned above, I may use in like manner a modified #364 dye, also sold as Brilliant Yellow, which has m-cresyl groups in place of the phenol groups indicated above.

An oriented amorphous film of the above dye treated with acid, or an acid salt, becomes black and may serve as the transparent polarizing coating for a mirror as shown for example in the drawings.

In a typical mirror, a film of Brilliant Yellow is applied to the brushed glass face of a silvered mirror in the manner described above. The resulting amorphous film 11 is then treated with a concentrated aqueous solution of stannous chloride to convert it to a permanent black dichroic reflector. Or a sheet of cellophane, the surface of which is suitably oriented, may be coated with the dye solution and the dye oriented in an amorphous film as described (with or without acid treatment to convert it to a black) and the film thus treated may then be applied to the surface of a mirror, and the mirror is ready for use. In this case, as with the other examples, the amorphous polarizing film may be applied to the face of the mirror or to the cellophane or other cover which is then applied to a suitable base after conversion of the film.

Another dye suitable for reflecting type films is Zapon fast blue, which is commercially available as a lacquer color under that name, being a product of General Dyestuffs Corp., and which is understood to be a highly sulfonated copper phthalocyanine combined with higher aliphatic dimethyl amine, (ordinarily the commercial mixture of higher aliphatic tertiary amines known as "lorol" dimethyl amine). This dye may be applied to a clean brushed glass surface at room temperature in concentrated solution in methanol. The film may be of a thickness which naturally adheres to the plates after dipping or flowing. This film is dried by exposure to a gentle flow of air at 70° F. When the film is dry it is transparent and slightly tinted a blue-green in ordinary light and in plane polarized light when angularly arranged to pass such light. When arranged at the extinction angle in plane polarized light, however, the coloring becomes an intense blue-green. Upon treatment of this film in accordance with my invention, with a concentrated aqueous solution of stannous chloride, rinsing with clear water and drying, the color by transmitted light is changed to purplish blue with a reddish copperlike reflection polarized perpendicularly to the transmitted light. The polarizing efficiency is increased by this treatment.

Other sulfonated metal phthalo cyanines, and in general metallo-organic compounds of the coordinate (or hydrogen) bond type with flat molecules free from twists and free from groups extending off on axes at angles to the principal plane of the molecule. Most suitable are long molecules which have several cyclic nuclei in the same or parallel planes and with alternating single and double bonds which give a conjugated system including said nuclei, can be used successfully in similar manner according to my invention. When such compounds are water soluble, they may be treated with a long chain compound such as laurylamine to make them water-insoluble but soluble in alcohol.

As may be readily understood, the invention is not limited to formation of mirrors which polarize light only in parallel planes throughout the reflected beam. By brushing along parallel curved lines or by brushing different areas in different directions, mirrors may be formed which reflect differently polarized light from different areas; although the light reflected from any given point is plane polarized. Curved and prismatic surfaces may be coated as well as plane surfaces.

I have now found that many polar substances capable of forming dichroic films in the above manner are handled to better advantage especially on an inorganic supporting surface, if they are aided by a polar substance the molecules of which include both lipophilic (i. e. attracted to organic substances of the fatty or hydrophobic types) and hydrophilic groups. Such substance may be applied as a very thin sub-film applied on the supporting base and oriented by rubbing and this may be merely by rubbing the base with a block or mass of the material which is to give the sub-film; or it may be added to the dichroic or potentially dichroic substance. This is particularly true of substantive dyes and especially of dyes having long chain linear molecules which are not cationic-active; whereas those having more stubby molecular structure or greater lateral extension in a flat molecule ordinarily are more easily oriented on clean rubbed glass without the use of sub-films according to the present invention. The linear molecule substance may be made suitable for orientation on clean glass by addition of a cationic-active group or by the use of a foreign substance on the glass of the type above mentioned.

In general, I have found useful the long chain amino and hydroxy compounds such as polyvinyl alcohol, methyl cellulose, cellulose acetate and other cellulose substances, lauryl amines and the like. For many purposes, the use of wet paper gives very good results when used as the means of brushing a base substance, such as glass, and the cellulosic material rubbed off onto the surface may be sufficient to serve the purposes of this invention.

Similar types of compounds, especially the long chain amino compounds are effective when added to the compound which is to be oriented in the film. This suggests that such sub-film or under layer may act chemically by molecular association, e. g., through coordinate linkage, with the oriented molecules of the applied film; and that these added linear compounds, whichever way they are used, serve in some way to assist in holding the oriented molecules in proper space relation.

Whether the film itself is used to reflect polarized image or to polarize a mirror image by transmission, it is of great advantage of my invention that the film is molecularly oriented and therefore can be directly at the reflecting surface without substantial thickness.

In the accompanying claims I use the phrase "optically smooth" to describe a mirror reflecting surface as distinguished from a diffusely reflecting surface. By "optically accurate" I mean a surface which conforms to any desired geometric form or combination of forms designed substantially to give predetermined optical results.

This application is a continuation in part of my prior copending applications Serial No. 217,249, filed July 2, 1938, now abandoned; No. 384,550, filed March 21, 1941, now Patent No. 2,400,877, May 28, 1946; and No. 407,720, filed August 21, 1941, now Patent 2,432,867, December 16, 1947.

I claim:

1. A light-polarizing mirror unit comprising a transparent protective facing; a solid, amorphous, optically-smooth dichroic film serving as a light reflector disposed at the back of said facing and having its surface molecules oriented along parallel lines, said optically-smooth dichroic film having the property of reflecting light incident thereon and also having the property of plane-polarizing the light so reflected, the reflected light being plane polarized by virtue of the oriented dichroic molecules, and the direction of the plane of polarization of the reflected polarized light depending on the direction of orientation of the molecules; and an opaque, non-reflecting backing for said film; the front and rear surfaces of said facing and film and the front surface of said backing being generally parallel one with another, and the front and rear surfaces of said facing being optically smooth.

2. A light-polarizing mirror comprising a solid amorphous dichroic optically-smooth transparent film the surface molecules of which are substantially uniformly oriented along parallel lines, said optically-smooth transparent film having the property of reflecting light incident thereon and also having the property of plane-polarizing the light so reflected, the reflected light being plane polarized by virtue of the oriented dichroic molecules, and the direction of the plane of polarization of the reflected polarized light depending on the direction of orientation of the molecules, and a member laminated with said film and providing an opaque non-reflecting backing.

3. A light-polarizing mirror unit comprising a transparent protective facing; a solid, amorphous, optically-smooth dichroic film serving as a light reflector disposed at the back of said facing and having its surface molecules oriented along parallel lines, said optically-smooth dichroic film having the property of reflecting light incident thereon and also having the property of plane-polarizing the light so reflected, the reflected light being plane polarized by virtue of the oriented dichroic molecules, and the direction of the plane of polarization of the reflected polarized light depending on the direction of orientation of the molecules; and a black glass backing, the front and rear surfaces of said facing and film and the front surface of said backing being optically smooth and generally parallel with one another.

JOHN F. DREYER.

REFERENCES CITED

The following references are of record in the file of this patent:

UNITED STATES PATENTS

| Number | Name | Date |
| --- | --- | --- |
| 1,610,423 | Cawley | Dec. 14, 1926 |
| 1,873,951 | Zocher | Aug. 30, 1932 |
| 2,122,225 | Wheelwright | June 28, 1938 |
| 2,158,129 | Land | May 16, 1939 |
| 2,167,899 | Marks | Aug. 1, 1939 |
| 2,173,304 | Land | Sept. 19, 1939 |
| 2,281,101 | Land | Apr. 28, 1942 |
| 2,327,612 | Stone et al. | Aug. 24, 1943 |
| 2,334,418 | Land | Nov. 16, 1943 |
| 2,336,680 | Gillespie | Dec. 14, 1943 |
| 2,359,457 | Young | Oct. 3, 1944 |
| 2,367,096 | Chubb | Jan. 9, 1945 |
| 2,379,790 | Dimmick | July 3, 1945 |
| 2,390,424 | Colbert | Dec. 4, 1945 |
| 2,400,877 | Dreyer | May 28, 1946 |

FOREIGN PATENTS

| Number | Country | Date |
| --- | --- | --- |
| 683,933 | Germany | Nov. 18, 1939 |